(12) United States Patent
Probst

(10) Patent No.: US 7,648,634 B2
(45) Date of Patent: Jan. 19, 2010

(54) METHOD FOR WASTEWATER TREATMENT

(75) Inventor: Thomas H. Probst, Waukesha, WI (US)

(73) Assignee: Procorp Enterprises, LLC, Milwaukee, WI (US)

( * ) Notice: Subject to any disclaimer, the term of this patent is extended or adjusted under 35 U.S.C. 154(b) by 0 days.

(21) Appl. No.: 12/168,247

(22) Filed: Jul. 7, 2008

(65) Prior Publication Data

US 2009/0014387 A1   Jan. 15, 2009

Related U.S. Application Data

(62) Division of application No. 11/406,051, filed on Apr. 18, 2006, now Pat. No. 7,396,453.

(60) Provisional application No. 60/672,755, filed on Apr. 19, 2005.

(51) Int. Cl.
*C02F 3/00* (2006.01)

(52) U.S. Cl. .................................................. 210/620

(58) Field of Classification Search ................ 210/604, 210/626

See application file for complete search history.

(56) References Cited

U.S. PATENT DOCUMENTS

| | | | | |
|---|---|---|---|---|
| 1,617,014 A | * | 2/1927 | Derleth ....................... | 210/626 |
| 3,784,457 A | | 1/1974 | Mizutani et al | |
| 4,415,452 A | * | 11/1983 | Heil et al. .................... | 210/614 |
| 4,501,664 A | * | 2/1985 | Heil et al. .................... | 210/614 |
| 4,959,237 A | | 9/1990 | Walker | |
| 4,988,525 A | | 1/1991 | Gresch | |
| 4,999,209 A | | 3/1991 | Gnekow | |
| 5,019,135 A | | 5/1991 | Sealock, Jr. et al. | |
| 5,032,265 A | | 7/1991 | Jha et al. | |
| 5,126,049 A | | 6/1992 | Hallberg | |
| 5,177,008 A | | 1/1993 | Kampen | |
| 5,250,182 A | | 10/1993 | Bento et al. | |
| 5,254,253 A | | 10/1993 | Behmann | |
| 5,360,546 A | | 11/1994 | Tomita et al. | |
| 5,374,356 A | | 12/1994 | Miller et al. | |

(Continued)

FOREIGN PATENT DOCUMENTS

WO        02/20415        3/2002

(Continued)

OTHER PUBLICATIONS

Cox, Ronald, Contamination Control, Filtering Out Confusion: Select the right liquid filter media for the right process, Food Quality, Jun. 23, 2009, www.foodquality.com.

*Primary Examiner*—Chester T Barry
(74) *Attorney, Agent, or Firm*—Michael Best & Friedrich LLP

(57) ABSTRACT

A system and method for treating wastewater includes a treatment container for receiving and treating wastewater and a mixing/aeration system disposed in the treatment container. Wastewater is pumped under pressure from the treatment container through a solids/liquid separation system, preferably comprising multiple parallel membrane bioreactors, to separate the solids and liquids in the wastewater. Liquid retentate from the solids/liquid separation system is cycled back to the treatment container via the mixing/aeration system. The closed-loop system and method for solids/liquid separation and aeration/mixing provides for reduced equipment requirements and energy usage during operation.

20 Claims, 6 Drawing Sheets

U.S. PATENT DOCUMENTS

| | | | |
|---|---|---|---|
| 5,399,267 A * | 3/1995 | Wang et al. | 210/604 |
| 5,503,750 A | 4/1996 | Russo, Jr. et al. | |
| 5,525,228 A | 6/1996 | Dague et al. | |
| 5,670,047 A | 9/1997 | Burke | |
| 5,746,919 A | 5/1998 | Dague et al. | |
| 5,773,526 A | 6/1998 | Van Dijk et al. | |
| 5,798,043 A | 8/1998 | Khudenko | |
| 5,919,367 A | 7/1999 | Khudenko | |
| 6,187,196 B1 | 2/2001 | Way et al. | |
| 6,338,799 B1 | 1/2002 | Fukushima et al. | |
| 6,355,456 B1 | 3/2002 | Hallberg et al. | |
| 6,368,849 B1 | 4/2002 | Norddahl | |
| 6,391,207 B1 | 5/2002 | Cluyse | |
| 6,406,629 B1 | 6/2002 | Husain et al. | |
| 6,423,236 B1 | 7/2002 | Shiota et al. | |
| 6,464,875 B1 | 10/2002 | Woodruff | |
| 6,485,645 B1 | 11/2002 | Husain et al. | |
| 6,488,854 B2 | 12/2002 | O'Leary et al. | |
| 6,514,411 B2 | 2/2003 | Pressley et al. | |
| 6,663,777 B2 | 12/2003 | Schimel | |
| 6,676,836 B2 | 1/2004 | Mandt | |
| 6,835,560 B2 | 12/2004 | Greene | |
| 6,994,782 B2 | 2/2006 | Bowers et al. | |
| 7,005,072 B2 | 2/2006 | Bowers et al. | |
| 7,037,704 B2 | 5/2006 | Dunn-Coleman et al. | |
| 7,135,116 B2 | 11/2006 | Haggerty | |
| 7,182,872 B2 | 2/2007 | Barak et al. | |
| 7,267,774 B2 | 9/2007 | Peyton et al. | |
| 7,279,100 B2 | 10/2007 | Devine | |
| 7,396,453 B1 * | 7/2008 | Probst | 210/150 |
| 2003/0066799 A1 | 4/2003 | Garcia et al. | |
| 2004/0025715 A1 | 2/2004 | Bonde et al. | |
| 2004/0159608 A1 | 8/2004 | Hoffland | |
| 2005/0023220 A1 | 2/2005 | Barak et al. | |
| 2005/0051495 A1 | 3/2005 | Bowers et al. | |
| 2005/0141966 A1 | 6/2005 | Greene | |
| 2005/0153410 A1 | 7/2005 | Hallberg et al. | |
| 2005/0252858 A1 | 11/2005 | Peyton et al. | |
| 2006/0000782 A1 | 1/2006 | Bowers et al. | |
| 2006/0006055 A1 | 1/2006 | Bonde | |
| 2006/0194299 A1 | 8/2006 | Brinch-Pedersen et al. | |
| 2007/0119763 A1 | 5/2007 | Probst | |
| 2007/0141691 A1 | 6/2007 | Hirl | |
| 2007/0199894 A1 | 8/2007 | Peyton et al. | |
| 2007/0243592 A1 | 10/2007 | David | |
| 2007/0244719 A1 | 10/2007 | David | |
| 2007/0249029 A1 | 10/2007 | Marshall et al. | |
| 2007/0254089 A1 | 11/2007 | Hickey et al. | |
| 2007/0275438 A1 | 11/2007 | David | |
| 2008/0003654 A1 | 1/2008 | Hirl | |
| 2008/0035036 A1 | 2/2008 | Bassani et al. | |

FOREIGN PATENT DOCUMENTS

| | | |
|---|---|---|
| WO | 2007/008630 | 1/2007 |

* cited by examiner

METHOD FOR WASTEWATER TREATMENT

This application is a divisional of U.S. patent application Ser. No. 11/406,051, filed Apr. 18, 2006, now U.S. Pat. No. 7,396,453, issued Jul. 8, 2008, which claims the benefit of U.S. Provisional Application No. 60/672,755, filed on Apr. 19, 2005. This divisional application claims priority to each of these applications and fully incorporates the entire subject matter thereof.

BACKGROUND OF THE INVENTION

Field of the Invention

The present invention relates generally to the field of treatment of wastewater, and more particularly to an improved system and method for treating wastewater containing contaminants, which system and method offer a broad array of advantages over conventional membrane bioreactors and/or activated sludge wastewater treatment systems, including lower operating costs, smaller size, better control of membrane fouling, higher rates of operation, high oxygen transfer efficiency, and a decreased level of excess sludge production.

With an increased awareness of problems with water quality, particularly those caused by the discharge of wastewater from industrial sources, has come a demand for improved equipment and methods to treat wastewater prior to discharging it into a sewer, to surface water, reuse for irrigation, recycling or other "grey water" applications, or to other destinations for effluent discharge. While such treatment systems and methods are generally not required to produce potable water, they are increasingly required by law to enhance the quality of wastewater prior to discharging it as effluent. For industrial waste, this treatment process must typically remove certain types of pollutants such as organic contaminants, nitrogen and phosphorus, metals, and suspended solids.

The first wastewater treatment systems were of simple design, with a single container or tank being used for both treatment of the wastewater and the removal of solids from the wastewater, typically by allowing them to settle out. These early wastewater treatment systems were not aerated, and typically generated foul odors as a byproduct of the process utilized by these systems. Over time, these early wastewater treatment systems evolved into systems which use a popular type of wastewater treatment process referred to as the activated sludge wastewater treatment method.

The conventional activated sludge wastewater treatment system and method use an aeration tank which is followed by a solids/liquid separator which acts as a secondary clarifier to remove separated solids from the liquid, which is discharged by the system. As its name suggests, the contents of the aeration tank are aerated and mixed to facilitate an aerobic reaction (a reaction taking place in the presence of oxygen) which is facilitated by the presence of activated sludge. This activated sludge, which is an accumulation of microorganism-rich residue ("sludge") contained in the solids which are separated from the liquid in the solids/liquid separator, is seeded into the incoming wastewater in the aeration tank. In conventional activated sludge wastewater treatment systems, the concentration of activated sludge solids is typically 2,000 to 5,000 milligrams per liter in the aeration tank.

The aerobic reaction which takes place in the aeration tank includes three types of phenomena—absorption, adsorption, and biological digestion. Any one of these three phenomena will result in contaminants reacting with the bacteria contained in the activated sludge. Absorption takes place when a contaminant is absorbed into the cell wall of the bacteria contained in the activated sludge. Adsorption, on the other hand, is a surface phenomenon which takes place when there is an interaction between a contaminant and the surface of the activated sludge whereby the contaminant adheres to the surface molecules the bacteria. Biological digestion takes place when the bacteria contained in the activated sludge consume waste constituents contained in the wastewater. Biological digestion can occur after the material has been absorbed or adsorbed. Other mechanisms of treatment that may be involved include, but are not limited to, flocculation/coagulation, sedimentation, or enmeshment reactions that are induced by the activated solids.

As mentioned above, the reaction that takes place in the aeration tank is an aerobic reaction occurring in the presence of oxygen, which decreases both the amount of time required for the reaction to occur and the level of foul odors produced by the reaction. Typically, aeration and mixing may be produced by injecting compressed air or oxygen into the mixture, typically through diffuser devices located near the bottom of the aerator tank. As the air bubbles to the surface of the mixture, the diffused air provides both oxygen to the mixture and a vigorous mixing action. The amount of material contained in the wastewater may be characterized by the "chemical oxygen demand" or COD of the material. A chemical oxygen demand of one pound indicates that the material contained in the wastewater requires one pound of oxygen to degrade.

Air may also be added by the churning action of mechanical mixers located near the surface of the mixture contained in the aeration tank. In still another variation, mixing of the contents of the aeration tank may be caused by hydraulic pumping in which liquid is pumped out of the tank and back in through nozzles causing highly efficient mixing of the contents of the aeration tank. In a still further variation, air nozzles may be arranged around the liquid nozzles to further stimulate the mixing and simultaneously provide oxygen to the mixture. Still further variations include processes known as extended aeration and contact stabilization, both of which omit the primary settling step, and high-purity oxygen aeration, which can substantially reduce both the aeration time and the size of the aeration tank.

The conditions which are thus provided in the aeration tank promote the growth of the microorganisms introduced in the activated sludge with the resultant reaction removing contaminants from the wastewater. In conventional activated sludge technology, a predetermined period of time related to the strength of the wastewater, kinetics, environmental conditions and treatment objectives is required for the mixture to react in the aeration tank in the process. This time is required to allow the bacteria in the aeration tank to react with the contaminants contained in the wastewater, with much of the material being oxidized by the microorganisms. Generally, in conventional activated sludge processes, the contaminants are completely digested in the aeration tank.

In conventional wastewater treatment systems, the mixture is then allowed to flow from the aeration tank into a solids/liquid separator, as described in more detail herein. For example, the solids/liquid separator may be as simple as a secondary clarifier, which allows activated sludge to settle out by gravity. The clean liquid overflows from the separator and it is discharged as secondary effluent, while the activated sludge may be separated out in a settling tank. The bacteria tends to clump together and settle to the bottom of the settling tank, from which the activated sludge may be pumped out.

Some of the activated sludge will be recirculated back into the aeration tank, with this sludge being referred to as "return activated sludge" or RAS. The microorganisms contained in the return activated sludge are thus well acclimated to the environment in the aeration tank. The remaining activated sludge is treated and disposed of in a conventional solids processing technique which is well known to those skilled in the art. This sludge is referred to as "waste activated sludge" or WAS. In conventional activated sludge technology, the waste activated sludge may amount to as much as seventy percent of the sludge recovered in the solids/liquid separator.

The amount of excess activated sludge which is generated by an activated sludge waste treatment system may be controlled by a term referred to as "solid retention time" or SRT, which is the amount of time an average particle of solid material remains in the waste processing system. The solid retention time is inversely proportional to the relative volume of excess activated sludge which must be disposed of. Conventional extended activated sludge waste processing systems (designed for surface water discharge of effluent) have a solid retention time of approximately twenty days.

The excess solids produced may be determined by the yield of the activated sludge process multiplied by the mass of the contaminants removed. The yield may be measured in units of pounds of "chemical oxygen demand" or COD, which is a term commonly used to measure the amount of contaminants which are removed. Conventional extended activated sludge waste treatment systems produce a yield of approximately 0.25 pounds of "total suspended solids" or TSS of excess activated sludge per pound of chemical oxygen demand of yield. Less conservatively operated systems can produce yields of 0.7 pounds of total suspended solids per pound of chemical oxygen demand removed.

The waste activated sludge is typically accumulated, and may be further biologically processed and/or dewatered prior to its ultimate disposal.

Membrane bioreactors ("MBRs") have been used more recently in wastewater treatment as a means to improve upon conventional activated sludge wastewater treatment processes, combining the biological treatment, as described above, with a membrane separation step. In particular, an MBR uses membranes, rather than settling, to separate and concentrate the biomass by removing wastewater—eliminating the need for secondary clarification and/or filtration.

Depending on the contents of the waste stream, the given system requirements and quality requirements of the effluent, the membranes utilized in an MBR can be of any type or porosity. Generally, MBRs can include reverse osmosis, nanofiltration, ultrafiltration, microfiltration and any other solids/liquid separation membranes known to those skilled in the art. Thus, in addition to removing biodegradable organics, suspended solids and inorganic nutrients, MBRs retain particulate matter, remove a very high percentage of pathogens and/or remove dissolved materials from the wastewater.

Because the membranes act as substantially absolute barriers to the bacterial particulate and utilize a hydraulic pressure differential across the membrane as a separating mechanism, MBR systems operate at higher MLSS (mixed liquor suspended solids) concentrations over traditional activated sludge systems as most of the biomass is recirculated inside (or back to) the bioreactor—accordingly, the footprint of an MBR system is often smaller than typical activated sludge systems.

There are two types of MBR—a first type ("a submerged MBR") in which the membrane unit(s) are mounted directly in the aeration tank of the activated sludge treatment system and a second type (a "side stream" or "SS" MBR) in which the membrane unit(s) are external to the aeration tank. In the submerged MBR, the head pressure of the wastewater on the outside of the submerged membranes provides lower but sufficient differential pressure to drive the wastewater through the membranes and concentrate the biomass in the bioreactor. Typically, the head pressure is supplemented by a suction pump connected to the permeate outlet side to create a higher differential pressure across the membranes. To prevent fouling in a submerged system, cross-flow along the membrane surface is achieved using an airlift flow (air blowers and/or air spargers positioned in the aeration tank below the membranes).

In the external MBR system, the membrane modules are placed, typically in series configuration, downstream from the bioreactor. The biomass is drawn from the bioreactor and pumped through the membranes where wastewater is removed as permeate and suspended organic and mineral solids, dissolved organic matter, and bacteria are retained and returned to the bioreactor more concentrated. In this configuration, the biomass is pumped under pressure from the aeration tank through the membranes—such pump providing the differential pressure across the membrane.

While the MBR wastewater treatment systems and methods currently known in the art present an advantageous way to remove contaminants from wastewater, they do, however, present a number of disadvantages as well. First, by operating at high MLSS concentrations, the build-up of solids at the membrane surface decreases permeability of the membranes, thereby increasing the pressure needed to maintain the flux at acceptable levels. Further, increasing the pressure required to maintain a high flux through the membrane increases the energy cost of system operation. In addition, membrane fouling requires periodic shutdown and/or chemical cleaning of the membrane system—which can be disruptive to users of the system. Further, the membrane modules themselves are expensive.

In addition to these disadvantages, biological digestion/treatment and solids/liquid separation have traditionally been viewed as two separate processes, and thus, current membrane bioreactor configurations (or any solids/liquid separation system following biological treatment or digestion) can include a significant amount of redundancy in equipment. For example, in addition to the pumps required to hydraulically mix and/or aerate the aeration tank, a separate vacuum and/or supply pump must be included to overcome dynamic losses through the membrane and to maintain the desired operating pressure in the system. A further recirculation pump from the membrane system back to the bioreactor tank is also required. Such configurations require a substantial amount of energy input, rendering these systems cost prohibitive in certain applications.

In addition, solids/liquid separation systems, including MBR configurations, usually include an equalization tank/balance tank to handle variation in the flows so that the MBR can be sized to treat the average daily flow to the system, rather than the peak daily flow. Accordingly, redundancy in equipment, including not only tanks and pumping equipment, but also monitoring and process control equipment mandate a relatively large amount of space in which to install them—thus, any wastewater treatment configuration that can reduce the required system footprint of the wastewater treatment system would be a significant economic and operational advantage. Further, a reduction in the required equipment for such system can reduce the initial capital costs, installation costs and maintenance costs.

Also, as noted above, presently known activated sludge systems produce a substantial amount of waste activated sludge which must be disposed of. This high disposal burden presents both storage problems and a significant cost to transport the sludge away for disposal. Thus, it will be appreciated that any wastewater treatment system that can reduce the amount of waste activated sludge would also be a significant economic and operational advantage.

Finally, operating an activated sludge system is a relatively complex process with a number of variables; it would be preferable to have a simpler system if possible.

It is accordingly the primary objective of the present invention that it provide an improved waste processing system which is smaller and therefore less expensive to initially purchase and install than a conventional activated sludge and solids/liquid separation system.

It is still another objective of the waste processing system of the present invention that it require less energy to drive the solids/liquid separation system, hydraulically mix the aeration tank, and/or provide oxygen to the reaction to further reduce operating costs, and that it do so without adversely affecting either the biological digestion of organic waste solids or the time required to achieve solids/liquid separation. It is a still further objective of the waste processing system of the present invention that it present a simplified operating process which is easy to operate and which presents relatively few potential problems in its day-to-day operation.

It is a closely related objective of the waste processing system of the present invention that it be capable of operating at a higher rate than comparable conventional systems to deal with increased loads of contaminants, or to produce higher quality effluent, or both. It is an additional objective of the waste processing system of the present invention that it produce a reduced amount of sludge, thereby substantially reducing the cost of operation of the system.

The waste treatment system of the present invention must also be of construction which is both durable and long lasting, and it should also require little or no maintenance to be provided by the user throughout its operating lifetime. In order to enhance the market appeal of the waste treatment system of the present invention, it should also be of inexpensive construction to thereby afford it the broadest possible market. Finally, it is also an objective that all of the aforesaid advantages and objectives be achieved without incurring any substantial relative disadvantage.

SUMMARY OF THE INVENTION

The disadvantages and limitations of the background art discussed above are overcome by the present invention. With this invention, a wastewater treatment system and method is provided in which an inline solids/liquid separation system is integrated with a hydraulic mixing system and/or an aeration system, in order to achieve all of the objectives mentioned above without incurring a single significant disadvantage. The present invention directs the output flow from the mixing system/aeration system pumps through the solids/liquids separation system before such output wastewater is supplied to the mixing/aeration system. The present invention can be utilized in any wastewater treatment system incorporating such a mixing system/aeration system and a solids/liquids separation system, and as such, may include any required mechanical, chemical and/or biological processing steps and/or be of virtually any design.

The solids/liquid separation system (SLS) used in the present invention can be any of those known to those skilled in the art including, but not limited to, membrane technology (microfiltration, ultrafiltration, nanofiltration, reverse osmosis, biomedical filtration, etc.), barriers, centrifuges, cyclones and/or any inline process to affect separation of solids from the treated effluent.

In one aspect of the present invention, the solids/liquid separation system comprises a plurality of membrane modules arranged horizontally in a parallel configuration with respect to the membrane feed pump. The hydraulic mixing system is a jet aeration system and/or any mixing system known to those skilled in the art. Accordingly, the present invention integrates the feed pump of the jet aeration system with the solids/liquid separation system such that the solids/liquid separation system does not require an independent suction pump and/or a supply pump to drive wastewater through the membrane/SLS.

The present invention eliminates redundancy in equipment and controls costs by operating the system in a substantially "closed loop" manner, wherein a pump may be used to supply both the hydraulic mixing system and the solids/liquid separation system—taking advantage of the pressure head of the wastewater in at least one of the wastewater treatment tanks (preferably, an aeration tank requiring jet aeration, an anoxic treatment vessel and/or an anaerobic treatment vessel requiring hydraulic mixing) to operate at a higher system pressure. Unlike conventional systems, the SLS supply pump accounts for pressure losses in the solids/liquid separation system (transmembrane pressure) and jet aeration system losses (loss through the aeration nozzle and loss associated with hydraulic mixing), dynamic/frictional losses and/or any static lift losses associated with placement of the pump and the SLS system relative to the liquid head in the tank to be integrated. Accordingly, the wastewater treatment system of the present invention uses less energy and is less expensive to operate than conventional wastewater treatment systems. In addition, with the elimination of a pumping system and/or one or more level, flow or pressure control/balancing systems, the present invention is less expensive to purchase, install and maintain over prior art systems.

Accordingly, the present invention can comprise, in part, a waste processing system for removing contaminants from wastewater. The system can comprise one or more containers for one or more of aerobic digestion, anaerobic digestion, chemical treatment, nitrification, or denitrification, the one or more containers each having a top, a bottom and a height dimension therebetween for receiving wastewater from the wastewater stream; a mixing system disposed at a level the container capable of mixing the wastewater in the container at the required rate, the mixing system including an inlet for receiving recycled wastewater and an outlet for discharging high-pressure wastewater into the container; a pump having an inlet and an outlet, the inlet of the pump configured to receive wastewater from substantially the bottom of the container; and a solids/liquid separation system having an inlet in fluid communication with the outlet of the pump, a retentate outlet in fluid communication with the inlet of the mixing system, and a permeate outlet; wherein the pump provides wastewater to the solids/liquid separation system at a pressure and flow rate capable of satisfying the pressure and flow rate of both the solids/liquid separation system and the mixing system.

Further, in part, the present invention can be a method of removing contaminants from a wastewater stream. The method can include (1) admitting wastewater into a container having a height dimension and filling the container to a level with wastewater; (2) mixing and/or aerating the wastewater in the tank with a mixing system and/or an aeration system, wherein at least one of the mixing and/or aeration systems includes an inlet for receiving recycled wastewater/concentrated mixed liquor and an outlet for discharging the recycled mixed liquor into the container; (3) treating the contaminants in the wastewater by at least one of aerobic digestion, anaerobic digestion, chemical treatment, nitrification, or denitrification; (4) pumping the wastewater from the bottom of the container via a pump having an inlet and an outlet; (5) providing the wastewater to a solids/liquids separation system in fluid communication with the outlet of the pump at a pressure and a flow rate sufficient to affect separation of the solids and the liquid in the wastewater stream within the solids/liquids separation system; (6) recycling the retentate to the inlet of the mixing and/or aeration system and (7) drawing off treated effluent.

The apparatus of the present invention is of a construction which is both durable and long lasting, and which will require little or no maintenance to be provided by the user throughout its operating lifetime. The apparatus of the present invention is also of inexpensive construction to enhance its market appeal and to thereby afford it the broadest possible market. Finally, all of the aforesaid advantages and objectives are achieved without incurring any substantial relative disadvantage.

DESCRIPTION OF THE DRAWINGS

These and other advantages of the present invention are best understood with reference to the drawings, in which.

DETAILED DESCRIPTION OF THE PREFERRED EMBODIMENT

It will be appreciated by those skilled in the art that while the present invention is described with reference to utilization of membranes for solids/liquid separation after biological treatment, the present invention, and the inherent advantages achieved therewith, can be utilized with and/or integrated into any wastewater treatment system known to those skilled in the art. Further, the present invention can be used with a wastewater treatment system incorporating any type of solids/liquid separation system including, but not limited to, membrane technology (microfiltration, ultrafiltration, nanofiltration, reverse osmosis, biomedical filtration, etc.), barriers, centrifuges, cyclones and/or any inline process to affect separation of solids from the treated effluent.

It will further be appreciated by those skilled in the art that the present invention can be used and/or integrated into any new or existing wastewater treatment system including batch, semi-batch, continuous and/or discontinuous operations. The invention may be applied to any wastewater treatment system including aerobic or anaerobic systems, chemical treatment, phosphorous removal, nitrification, denitrification, or any treatment process known to those skilled in the art or a combination thereof. Moreover, it will be appreciated by those skilled in the art that the present invention may be readily incorporated into any wastewater treatment scheme including those requiring both anoxic and aerobic tanks and/or zones. Thus, the present invention can be used in schemes where single or multiple tanks and/or zones are used for wastewater treatment.

Prior to a discussion of the preferred embodiment of the present invention, it is useful to briefly discuss previously known activated sludge waste processing systems including a solids/liquid separation system. In particular, FIGS. 1 and 2 illustrate conventional configurations for membrane bioreactors (MBRs).

Figure 1:
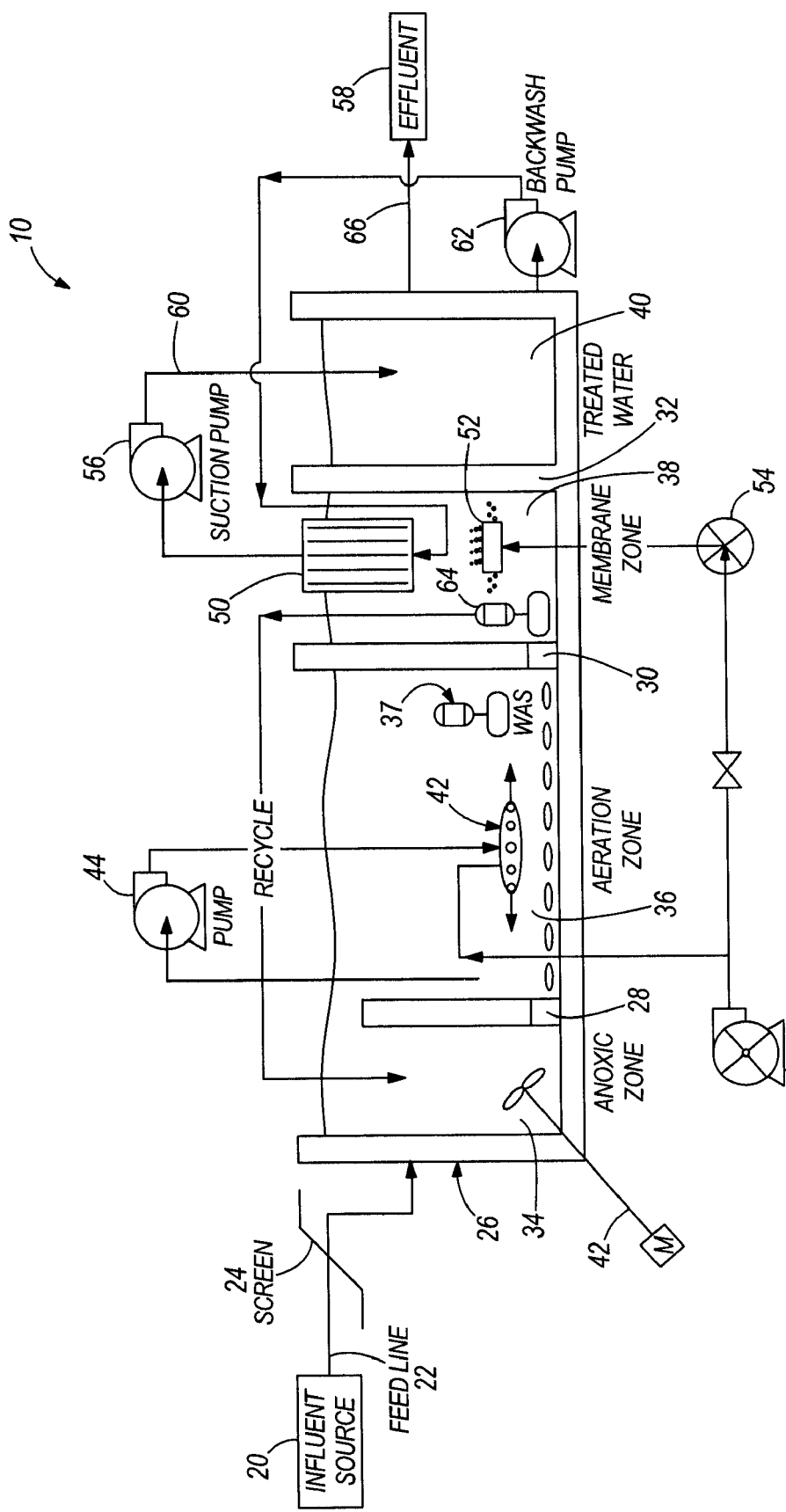
FIG. 1 is a somewhat schematic process flow diagram of a prior art MBR system used to remove contaminants from wastewater having a submerged membrane system wherein a separate tank and/or membrane zone and both a suction pump and a recycle pump are required to achieve enough system pressure to affect adequate flow through the system.
Figure 2:
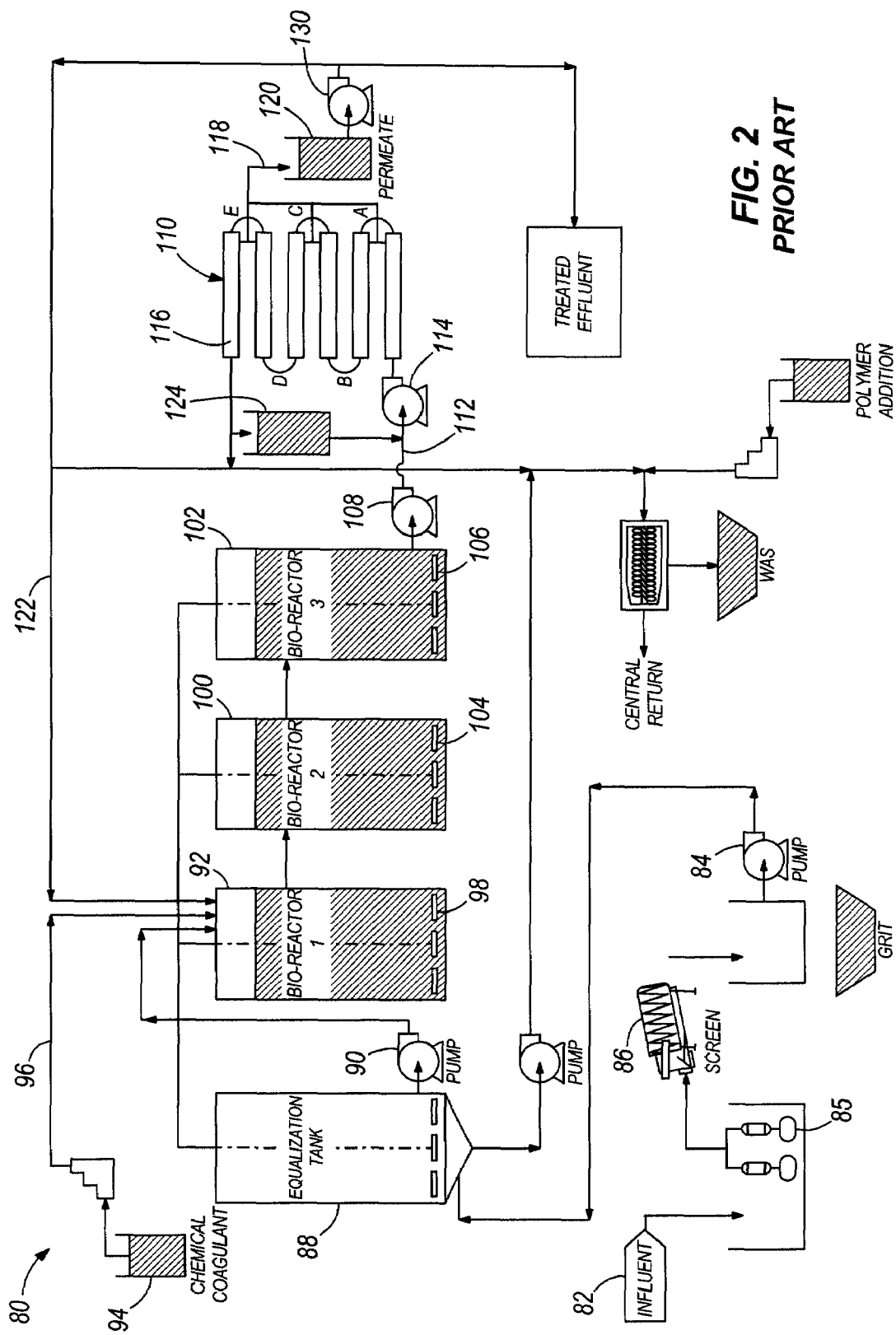
FIG. 2 is a somewhat schematic process flow diagram of a prior art MBR system used to remove contaminants from wastewater having an external membrane system wherein a separate balance tank and both a supply pump and a recycle pump are required to achieve enough system pressure to affect adequate flow through the system.

Referring to FIG. 1, a previously known MBR system 10 having a submerged membrane configuration is illustrated. Wastewater containing contaminants enters the system 10 from a source of wastewater 20, from which it flows through feed line 22 through a screen 24, optionally provided to remove grit and/or larger particulate. The wastewater flows into a bioreactor, indicated generally at 26.

Weirs 28, 30 and 32 divide the bioreactor 26 into a number of treatment zones, including an anoxic zone 34, an aeration zone 36, a membrane zone 38 and treated water zone 40. It will be appreciated that separate vessels connected by conduits could be employed as an alternative to the bioreactor configuration illustrated in FIG. 1. The wastewater flows into the anoxic zone 34 which can be equipped with a mixer 42 for denitrification. Effluent from the anoxic zone flows over the weir 28 into the aeration zone 36.

Aeration zone 36 includes activated sludge, with the source of activated sludge being from a recirculation of activated sludge produced during the waste treatment process; accordingly, the activated sludge introduced into the aeration zone 36 would generally be referred to as return activated sludge. Typically, the concentration of activated sludge solids in conventional membrane bioreactors can range from greater than about 5,000 to about 15,000 milligrams per liter, depending on the type of membrane utilized.

Hydraulic mixing and aeration occurs using a jet aeration system, indicated generally at 42. The jet aeration system 42 includes a pump 44 for continually circulating/mixing the wastewater in the aeration zone 36 and for ensuring sufficient oxygen transfer in the aeration zone 36. The jet aeration system 42 also includes a source of oxygen from a blower 46, air compressor or other source, as will be well known to those skilled in the art, for providing the required oxygen and keeping the solids in suspension. Either oxygen in air, pure oxygen or enriched oxygen can be introduced into the bottom of the aerobic zone 36 using the aeration system. As is well known to those skilled in the art, aeration can cost up to about 70% or more of the total energy costs of a wastewater treatment system.

It will be appreciated that aeration and mixing in the aeration zone 36 can encompass two separate systems. This may be accomplished by providing air to a compressor pump, which provides the compressed air to the bottom of the aeration zone 36 (such as via coarse and/or fine bubble diffusers)

and providing a separate mechanical mixer. Other ways of introducing oxygen to the aeration zone 36 and/or mixing the contents of the aeration zone 36 are well known in the art.

Aeration zone 36 may also include a pump 37 for pumping out waste activated sludge (WAS) from time to time, as the process calls for such removal.

From the aeration zone 36, the wastewater and contaminants flow into the membrane zone 38. The bioreactor 26 may be designed to permit wastewater flow over the weir 30 from the aeration zone 36 to the membrane zone 38, or there may be a feed line provided from the aeration zone 36 to the membrane zone 38. In many conventional applications, the wastewater is pumped from the biological treatment zone to the membrane zone.

The membrane zone 38 includes one or more membrane modules 50 which can be any type of separation membrane known to those skilled in the art. The membrane modules 50 are at least partially submerged inside the membrane zone 38. The membrane zone 38 also includes a membrane aerator system 52, such as a fine and/or coarse bubble diffuser, for scouring the membranes to inhibit fouling of the membranes 50. A source of air from a blower 54, air compressor or other source, is provided, as will be well known to those skilled in the art. It will be appreciated that the aeration zone 36 and the membrane zone 38 may be provided with an integrated aeration system designed to maximize oxygen transfer/bubble formation in each of the zones where required by the given separation operation.

A suction pump 56 is connected to the permeate outlet side of the membranes 50 to maintain a negative pressure on the permeate side of the membrane in order to achieve the required transmembrane pressure and flux across the membrane. Accordingly, wastewater is drawn through the membrane modules 50 by pump 56 such that the filtered effluent is pumped out of the membrane zone 38 and into the treated water zone 40 through a line 60. (Transmembrane pressure is the driving force for membrane filtration and is the difference in pressure from the feed side of the membrane to the permeate side of the membrane. The flux is the flow of permeate water per unit surface area of the membrane and is a function the physical characteristics of the membrane, mode of operation and the operating conditions.)

In order to clean the membrane modules 50, a backwash pump 62 is provided to reverse the flow of permeate to the membranes to remove solids build-up on the surface of the membranes and restore uniform flux across the membrane. Cleaning can be performed at regular intervals or at a given reduction of flux or transmembrane pressure, as will be well known to those skilled in the art.

The retentate flows out of the membrane modules 50 and, accordingly, the concentrated biomass is discharged back into the membrane zone 38. It will be appreciated that because the membrane zone 38 contains a high concentration of solids (increased viscosity) due to the presence of the retentate, there is a greater likelihood of solids build-up on the surface of the membrane.

A recycle pump 64 recycles the concentrated biomass from the membrane zone 38 back to the anoxic zone 34. In conventional applications, it will be appreciated that pump 64 must be sized to provide a sufficient flow to maintain the desired mixed liquor suspended solids (MLSS) concentration in the anoxic and/or aeration zones and/or to supply sufficient pressure of concentrated biomass back to the anoxic zone 34 to achieve the desired mixing of the anoxic zone 34—especially where the mixer 42 is not employed. The pump 64 may be controlled based on the level in the membrane zone, the anoxic zone and/or the aeration zone, or via any other control scheme/mechanism known to those skilled in the art.

The treated effluent 68 flows out of the bioreactor 26 from the treated water zone 40 through the discharge line 66. The effluent 68 can be directly recycled for reuse (depending on the type of membrane modules 50 utilized) or alternatively can be treated via tertiary operations.

Turning briefly to FIG. 2, another previously known MBR system having an external membrane configuration is illustrated. It will be noted that the MBR system illustrated in FIG. 2 includes additional pretreatments (mechanical, chemical and/or biological) of the incoming wastewater prior to solids/liquid separation compared to the system illustrated in FIG. 1.

Wastewater containing contaminants enters a MBR system 80 from a source of wastewater 82, from which pumps 85 move the wastewater through a screen 86, optionally provided to remove grit and/or larger particulate. A pump 84 pumps the wastewater into an equalization tank 88, provided to balance the flows across the system—ensuring accommodation in the system of peak flows. The wastewater is pumped via pump 90 into the first of a series of bioreactors 92.

The bioreactor 92 may be any type of reactor known to those skilled in the art including, but not limited to, anaerobic, anoxic and/or aerobic, depending on the processing requirements for the stream of wastewater. A chemical coagulant 94, such as alum, may be added to the bioreactor 92 via line 96 to precipitate soluble phosphates to reduce phosphorous discharge. The bioreactor 92 is provided with an aeration and/or mixing system 98 to ensure adequate mixing and oxygen transfer, where required.

The wastewater will flow from bioreactor 92 to one or more bioreactors, 100 and 102. At least one of the bioreactors 92, 100 and/or 102 will be an aerobic treatment reactor including activated sludge, with the source of activated sludge being from a recirculation of activated sludge produced during the waste treatment process, as is well known to those skilled in the art. It will be appreciated that bioreactors 100 and 102 will require adequate mixing and/or aeration provided by systems 104 and 106, respectively.

Wastewater leaving the bioreactor 102 must be pumped via pump 108 to the membrane system (the solids/liquid separation system), indicated generally at 110, through a line 112. Permeate exits the membrane system 110 through a line 118 where it is collected in a tank 120. A pump 130 is provided to pump the treated effluent from the tank 120 when required.

The retentate flows out of the membrane system 110 and, accordingly, the concentrated biomass is either recycled back to the bioreactor 92 via line 122 and/or it is discharged into a balance tank 124, from which it is in turn fed along with the wastewater stream exiting the bioreactor 102 to the membrane system 110. It will be appreciated that because the retentate contains a high concentration of solids, there is a solids build-up in the tank 124, resulting in a higher concentration of solids entering the membrane system 110.

Accordingly, a pump 114 is further provided to ensure proper transmembrane pressure and membrane flux are achieved in the membrane system 110. It will be noted that the membrane system 110 is configured with membrane modules 116 in a series arrangement. As such, the concentration of solids increases after each membrane module (see A through E, as indicated on FIG. 2 wherein the concentration of solids in stream E is greater than that of stream D, which is in turn greater than that of stream C, which is in turn greater than that of stream B, which is in turn greater than that of stream A). Thus, pump 114 must be sized to ensure sufficient pressure to overcome the pressure losses in each of the membrane modules 116, the increase in viscosity exhibited therein and to ensure adequate flow/pressure of recycled retentate back to the bioreactor 92.

Figure 3A:
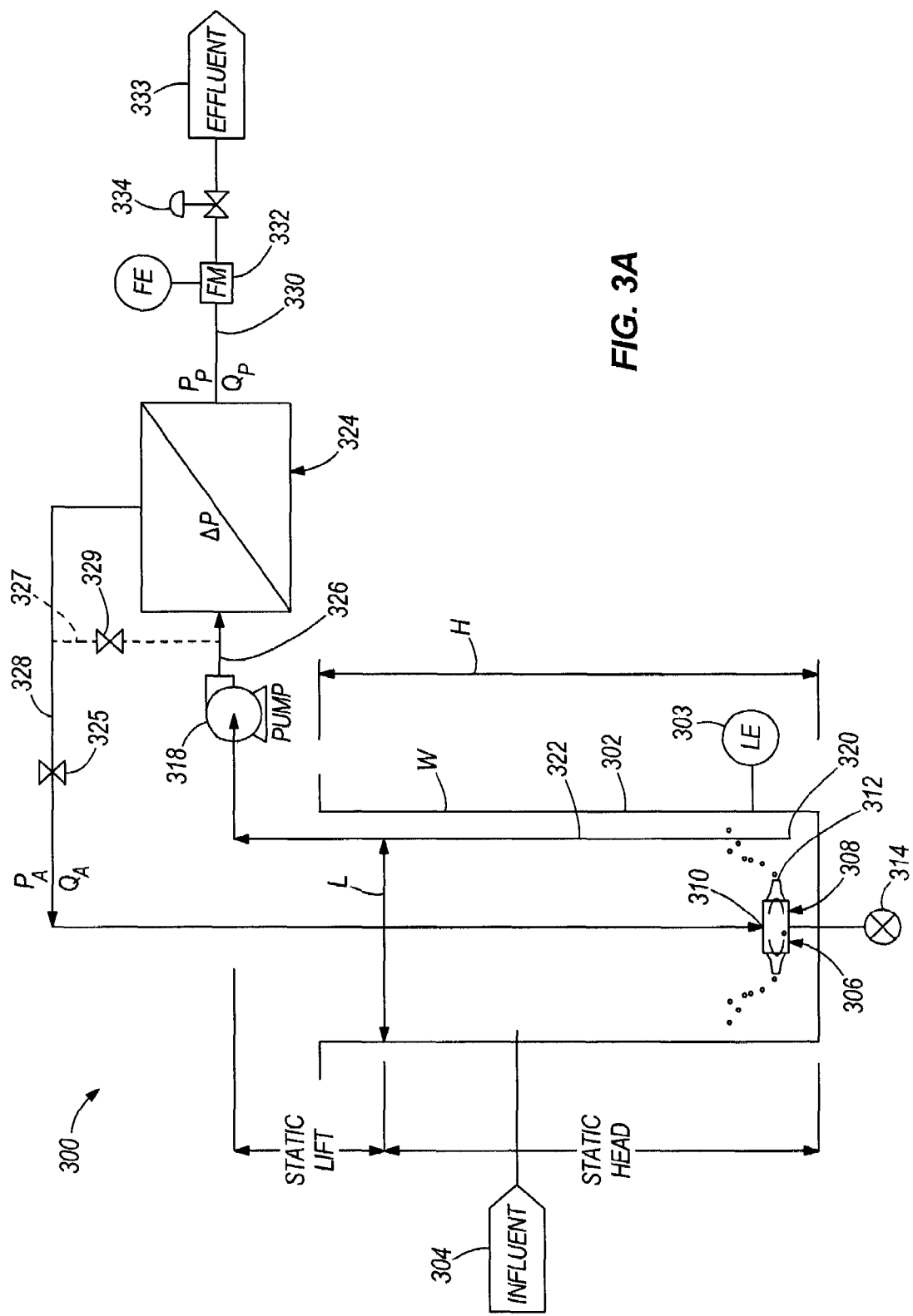
FIG. 3A is a somewhat schematic process flow diagram of a wastewater treatment system of the present invention illustrating a submerged tank with a pump and solids/liquids separation system at grade level.
Figure 3B:
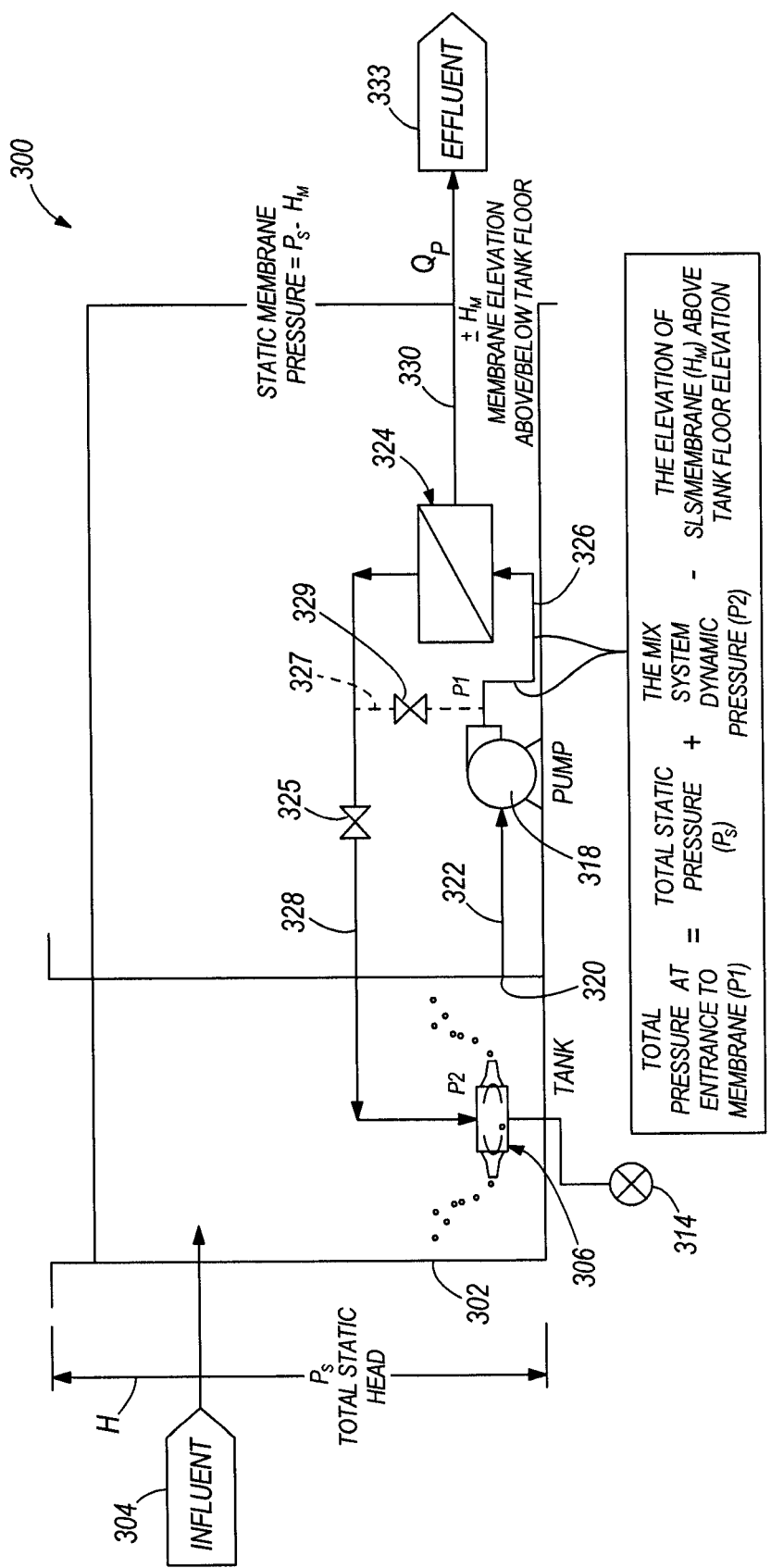
FIG. 3B is a somewhat schematic process flow diagram of an alternate embodiment wastewater treatment system of the present invention illustrating a biological processing tank with a pump and solids/liquids separation system at grade level.

Turning now to FIG. 3 (FIGS. 3A and 3B), the basic configuration for a waste processing system 300 of the present invention is illustrated. As mentioned above, the most significant change over the systems described in FIGS. 1 and 2 above, is that the system illustrated in FIG. 3 combines the hydraulic mixing system and/or the aeration system of the biological treatment portion of a wastewater treatment system with the inline solids/liquid separation process which, while eliminating the need for redundancy in equipment, greatly reduces the energy required to operate the system. It will be appreciated that while a simplified system of the present invention is illustrated, the system may additionally include any chemical treatment, phosphorous removal, nitrification, denitrification, settling tanks, clarifiers, extraction, etc. known to those skilled in the art. The invention may be used in any wastewater treatment system including not only biological treatment, but also physical, chemical and/or thermal treatment of wastewater.

An aeration tank 302 of a height H is provided. A level controller 303 may be provided in the tank 302 to determine the level of wastewater contained therein. It will be appreciated that the aeration tank 302 is capable of operating in batch mode, continuous mode, semi-continuous mode or discontinuous mode, all with equally high-quality results. Wastewater containing contaminants enters the system 300 from a source of wastewater 304 into the aeration tank 302. (For the purposes of the present description, wastewater in the tank 302 is illustrated at a level L in FIG. 3). Activated sludge is also introduced into the aeration tank 302, with the source of activated sludge being from a recirculation of activated sludge accumulated from the solids/liquid separation system (to be discussed below).

A jet aeration system 306 is included within the aeration tank 302 to hydraulically mix the wastewater in the aeration tank 302 and to provide oxygen to the bacteria in the tank, ensuring digestion of the waste organic matter. The jet aeration system 306 is preferably positioned near the bottom of the tank 302 to reduce settling of solids in the tank. The jet aeration system 306 includes at least one nozzle 308 having at least one inlet 310 for receiving recirculated and/or recycled mixed liquor/concentrated biomass, as will be described in more detail below. The nozzle 308 has at least one outlet 312 where the pressurized mixed liquor and/or entrained air exit the nozzle 308. At least one blower 314 may be provided to introduce oxygen into the aeration tank 302. Alternatively, oxygen may be introduced into the jet aeration system 306 by introducing compressed air into the bottom of the aeration tank 302 or by any means known to those skilled in the art.

The jet aeration system 306 preferably includes independent control of mixing and oxygen transfer such that airflow rates can be regulated without affecting mixing of the wastewater in the tank. As such, consistent with the broader aspects of the present invention, the process can also be operated in anaerobic, anoxic, or in a variable aeration mode where the aeration can be continuous, intermittent, or not used. Also, as noted previously, mixing and aeration conditions can be varied to facilitate desired physical, chemical, and biological reactions, as will be well known to those skilled in the art. Further, it will be appreciated by those skilled in the art that aeration may not be required by the wastewater treatment system—as such, the system 306 may include hydraulic mixing only.

A pump 318 draws water through a water inlet 320 of the line 322, positioned in the aeration tank 302, to feed a solids/liquid separation system 324 through a line 326. The pump 318 may be any type of pump known to those skilled in the art capable of providing the required pressure and flow rate output as described in more detail below.

The solids/liquid separation system 324 (the "SLS") is preferably a configuration of membrane modules (i.e. such as those utilized in conventional MBR systems shown in FIGS. 1 and 2). More preferably, the SLS 324 is a plurality of membrane modules arranged in a parallel configuration, as will be described in more detail below with reference to FIG. 4. The SLS 324 may include microfiltration, ultrafiltration, nanofiltration, reverse osmosis, biomedical filtration, barriers, centrifuges, cyclones and/or any inline process to affect separation of solids from the treated effluent known to those skilled in the art.

Where the SLS utilizes membrane technology, the membrane modules are preferably tubular, however, plate and frame, spiral wound, hollow fiber, and/or any membrane type or configuration known to those skilled in the art may be utilized. Indeed, where the waste stream includes certain contaminates and/or other types of organic or inorganic matter, specialty membranes may be required.

The feed pump 318 directs a flow of mixed liquor through the SLS 324 and a retentate/concentrated biomass stream exits the SLS 324 through line 328 and is recycled back to the jet aeration system 306. The line 328 can include a valve 325 to restrict flow through the SLS 324—where tuning of the flow through the SLS may be warranted to maximize cross flow velocity of the wastewater across the surface of the membranes to prevent build-up of solids on the membrane, to maintain the desired operating pressure and/or to achieve the optimal membrane flux. An optional bypass line 327 and valve 329 can direct some wastewater flow from line 326 to line 328, bypassing the SLS, in order to achieve such required flow rate, pressure and/or membrane flux in the system 300. It will be appreciated that the system of the present invention permits optimization of the cross flow velocity and/or the flux to membrane modules of the SLS 324 to scour the membranes to minimize fouling and ensure a more uniform flow across the membranes.

The treated permeate/effluent stream 333 exits the SLS 324 through a line 330, including a flow monitoring device 332 and a control valve 334 for monitoring and controlling the effluent flow out of the SLS 324. The flow monitoring device 332 and the control valve 334 may be integrated with the control of incoming wastewater 304 and/or the level controller 303 in the aeration tank 302. It will be appreciated that solids removal in the solids/liquid separation system 324 can be further optimized to achieve a desired permeate flow $Q_p$.

Consistent with the broader aspects of the present invention, the system 300 may be controlled in any manner required known to those skilled in the art. For example, the system 300 illustrated in FIG. 3 may be operated in batch, semi-batch, continuous and/or discontinuous operations. Further, such control can be dependent on the contaminants/constituents of a given waste stream to be treated. Accordingly, control of the system can include one or more process variables including, but not limited to, solids concentration, oxygen demand (DO and/or BOD), TOC, pH, conductivity, ORP, specific contaminant concentrations, temperature, operational pressures, flow rates, etc., as will be well known to those skilled in the art. For example, allowing the DO to drop to less than a certain level before activating an aeration scheme is one of many common control schemes utilized for nitrification. Such control schemes/algorithms are well known to those skilled in the art.

In addition, consistent with the broader aspects of the present invention, the wastewater treatment system 300 of present invention is illustrated in FIG. 3A such that the tank 302 is beneath grade and the pump 318 and the solids/liquids separation system 324 are at substantially grade level. However, it will be appreciated that the present invention may be arranged and configured in any orientation provided preferably that the pressure head of the liquid in the tank can be utilized to, at least partially, drive the solids/liquid separation. As such, the present invention can include the aeration tank 302, the pump 318 and the SLS 324 positioned at substantially grade level, as illustrated in FIG. 3B (where like reference numerals in FIG. 3B refer to like parts of FIG. 3A).

Accordingly, as illustrated in FIGS. 3A and 3B, the wastewater treatment system of the present invention integrates the feed pump 318 of the jet aeration system 306 with the SLS 324 such that the solids/liquid separation system 324 does not require an independent suction pump, permeate pump, recirculation pump and/or a supply pump to drive wastewater through the membrane/SLS.

As also illustrated in FIGS. 3A and 3B, in certain preferred embodiments of the present invention, the pump 318 is arranged and configured to utilize the pressure head of the wastewater in the aeration tank 302 to maintain the required transmembrane pressure for the solids/liquid separation system. In order to achieve the pressure $P_A$ and flow rate $Q_A$ of concentrated mixed liquor out of the SLS 324 required for the jet aeration system 306, the pump 318 need only account for the pressure loss across the membrane system 324, any loss associated within the jet aerator nozzle(s) 308 in the jet aeration system 306 and any static lift required to move the wastewater above the wastewater level L in the aeration tank 302, illustrated in FIG. 3A (or, alternatively, any loss associated with moving the wastewater above the tank floor, as illustrated in FIG. 3B). As such, the present invention provides a system and method for treating wastewater in which significant energy savings can be achieved by minimizing system pressure generation/fluid pumping requirements.

As will be well known to those skilled in the art, there may be additional process equipment located between the discharge outlet of the pump 318 and the SLS 324. For example, additional screens, centrifuges, or pretreatments may be included in the process. As such, the pump 318 will account for such additional system losses, while maintaining a constant pressure on the SLS 324.

Further, the present invention eliminates the need to include a balancing/equalization tank and/or a membrane tank/zone. In particular, because the concentrated mixed liquor is recycled to the aeration tank 302, and the membrane modules of the SLS 324 are external from the tank, the tank 302 can be sized to function as a balance tank and/or equalization tank for the system—absorbing peak flows and/or peak MLSS concentrations in the system, with the level L of wastewater in the tank being maintained at an optimal level L to provide sufficient head to drive the solids/liquid separation system. Elimination of a balance tank or zone reduces the footprint of the present system over prior art systems.

As such, the recycled, concentrated biomass stream entering the tank 302 through the jet aeration system 306 is combined with the contents of the aeration tank 302 to provide a stream of wastewater to the SLS 324 having a lower, more uniform concentration of solids than that of the entering recycled stream. In this way, the concentration of solids supplied to the SLS 324 from the aeration tank 302 is lower than that of prior art systems that require a smaller membrane tank or balance tank, and that recirculate at least a portion of highly concentrated retentate directly back into the membrane system. Accordingly, the present invention inhibits fouling by reducing the level of solids at the membrane surface and providing a more uniform concentration of solids across the membrane over the prior art. In addition, it will be noted that because the present invention reduces fouling of the membrane and provides a constant pressure across the membrane, the system of the present invention can provide a higher, more uniform rate of permeability.

It can be seen that the present invention is a clear advantage over the traditional MBRs illustrated in FIGS. 1 and 2. First, each of the prior art systems require a pump(s) to force/draw wastewater through the membrane modules and require a recycle pump(s) for mixing/sludge recycle of the return basins/tanks. Specifically, the present invention can be used to eliminate the suction pump 56, the recycle pump 64 and any associated monitoring and control devices of the submerged MBR system illustrated in FIG. 1. Further, the present invention can be used to eliminate at least one of the pumps 90, 108 and 114 of the external MBR illustrated in FIG. 2.

Indeed, as illustrated in FIGS. 3A and 3B, the present invention eliminates this duplicate requirement by operating the system in a substantially "closed loop" manner, wherein a pump (such as pump 318 or multiple pumps configured similar to pump 318) may be used to supply both the mixing system and the SLS—taking advantage of the pressure head of the wastewater in the biological treatment tank to operate at a higher system pressure. Ergo, the pump 318 accounts for SLS and jet aeration system losses, dynamic/frictional losses and any static lift losses associated with placement of the pump relative to the SLS system. Accordingly, the wastewater treatment system of the present invention uses less energy and is less expensive to operate than conventional wastewater treatment systems. In addition, with the elimination of a pumping system and/or one or more level, flow or pressure control systems, the present invention is less expensive to purchase, install and maintain over prior art systems.

Further, because the present invention eliminates the need for a balance or equalization tank, such as those illustrated in FIGS. 1 and 2, the present invention occupies a smaller footprint than conventional MBR systems. In particular, the present invention can be used to eliminate the membrane zone 38 and/or the treated water zone 40 of the system illustrated in FIG. 1—by moving the SLS external to the biological treatment system, as in the present invention, and utilizing a biological treatment zone (such as the anoxic/aeration zone) as the balance/equalization tank. Likewise, the present invention can be used to eliminate at least one of the tanks 88, 124 and 120 of the side-stream MBR illustrated in FIG. 2.

In addition, a system in accordance with the present invention can operate at a higher static system pressure, due to the hydrostatic head of the wastewater, over traditional wastewater systems. Increasing the pressure under which the bioreactor aeration system operates also increases the amount of oxygen that can be dissolved in the water. Accordingly, the present invention can utilize a higher/taller aeration tank, if desired, than current systems, since oxygen transfer is a limitation on the efficiency of current systems.

Moreover, the higher separation force that is possible with the system of the present invention allows higher activated sludge solids levels to be utilized, allowing for a smaller biological volume to be utilized, and therefore, a smaller process footprint to be utilized over conventional activated sludge systems. In turn, high MLSS concentrations and low SRT promote other numerous process benefits including, but not limited to, stable operation, complete nitrification, and reduced biosolids production. It will be appreciated that the wastewater treatment system of the present invention has many additional advantages, as will be apparent to those skilled in the art.

As recited herein, it will further be appreciated that while a simplified system has been illustrated, the present invention can be used, with one or more of the aforementioned advantages, on any existing system, such as those illustrated in FIGS. 1 and 2, to eliminate redundancy in equipment and reduce energy requirements. Accordingly, consistent with the broader aspects of the present invention, the system 300 may be modified in configuration to account for any existing system or landscape (at grade or above or below grade). Preferably, the wastewater treatment tank and the SLS are configured to take advantage of the hydraulic head of the wastewater and/or the pumping energy already required by at least one of the mixing and/or aeration systems in the wastewater treatment configuration.

Figure 4:
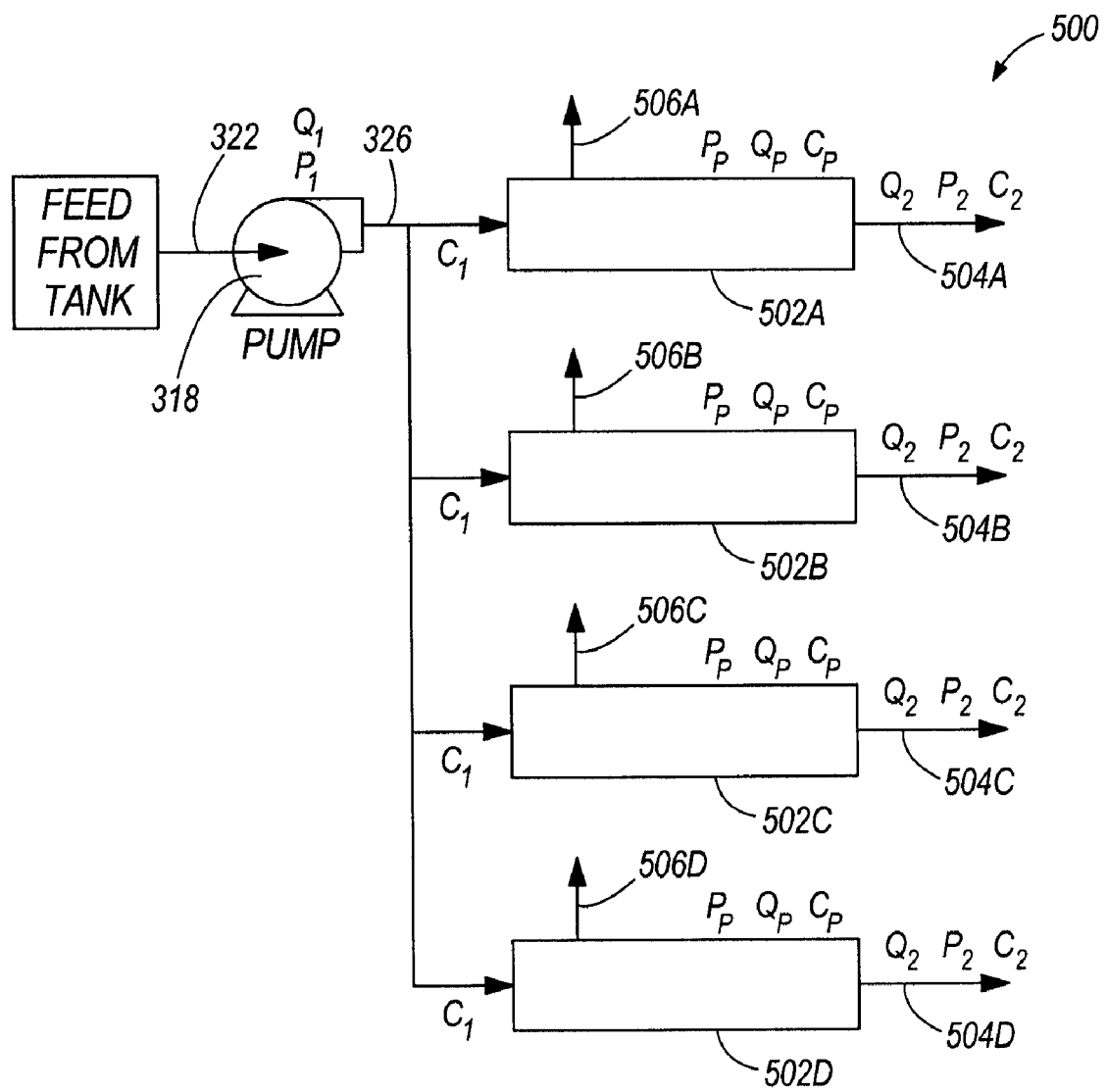
FIG. 4 is a schematic of a membrane configuration of the present invention, illustrating the membrane modules in a parallel configuration.

Turning next to FIG. 4, another aspect of the present invention is disclosed, including an improved membrane configuration 500 for use in the hydraulically integrated wastewater treatment system of the present invention and/or for use in any conventional membrane bioreactor. It will be apparent that the solids/liquid separation system 324 illustrated in FIG. 3 is preferably of or similar to the membrane filtration configuration 500 illustrated in FIG. 4. (For the purposes of the following discussion, like numbers will refer to like parts).

In FIG. 4, a plurality of membrane modules 502A, 502B, 502C and 502D are arranged horizontally in a parallel configuration with respect to a membrane feed pump 318 (e.g., membrane feed pump corresponding to pump 318 in FIG. 3). Preferably, each of the membranes 502A-D are tubular membranes. (However, the modules 502A-D may contain any type of membrane known to those skilled in the art). The retentate/concentrated biomass exits each module 502 A-D through lines 504 A-D, respectively, which will be preferably joined to form line 328 (in FIG. 3), to feed the jet aeration system 306 or other mixing/aeration system of the wastewater treatment system 300 of the present invention. Permeate exits each module 502 A-D through lines 506 A-D, respectively, which will be preferably joined to form effluent line 330.

The pressure and flow rate at the outlet of the pump 318 for supplying the membrane modules 502A-D is a pressure $P_1$ and a flow rate $Q_1$. It will be appreciated that, in parallel, each module is supplied with a wastewater stream having the same pressure ($P_1$), flow rate ($Q_1$) and solids concentration ($C_1$). Accordingly, where each of the membranes 502A-D are the same type and/or have substantially the same pressure loss/transmembrane pressure associated with driving the fluid through the membrane, the pressure $P_2$, flow rate $Q_2$ and solids concentration $C_2$ of the retentate/concentrated biomass stream exiting each of the membrane modules 502A-D will be substantially similar for each module 502A-D. Likewise, the pressure $P_p$, flow rate $Q_p$ and solids concentration $C_p$ of the permeate/effluent streams exiting each of the membrane modules 502A-D will be substantially similar for each module 502A-D.

Figure 5:
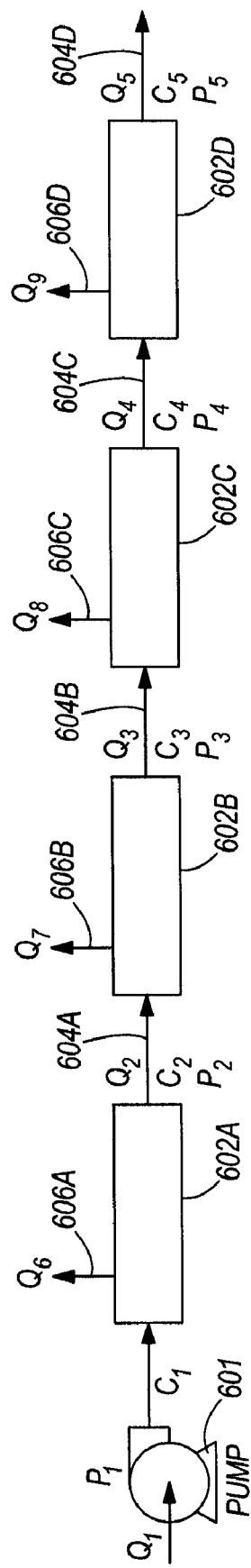
FIG. 5 is a schematic of a prior art membrane configuration, illustrating the membrane modules in a series configuration.

For comparison, FIG. 5 illustrates a membrane module configuration 600 of the prior art, wherein the membrane modules 602 A-D are configured in series. In this configuration, the pressure and flow rate at the outlet of the pump 601 for supplying the membrane modules 602 A-D is a pressure $P_1$, a flow rate $Q_1$ and a solids concentration $C_1$. However, unlike the present invention, the solids concentration $C_2$ through $C_5$ exiting each module 602A-D through lines 604A-D, respectively, increases with each pass—as permeate is withdrawn from each module 602A-D through lines 606A-D, respectively.

Thus, the feed streams $C_1$ to $C_4$ increase progressively in viscosity across the system, each membrane from 602A to 602D exhibits a progressively thicker solids layer build-up on the membrane surface. Accordingly, the cross flow velocity decreases, the transmembrane pressure and flux across the membrane increases, and the permeate flow rate ($Q_6$ though $Q_9$) decreases from module 602A to 602D. As such, the membranes 602A-D are more likely to foul than the membranes 502A-D illustrated in FIG. 4. More frequent fouling of the membranes requires more frequent membrane cleaning, and more frequent replacement of membranes. (Where one or more of the membranes experiences fouling additional pressure is required to achieve a given permeate flow rate—forcing the membranes to function outside their normal flux range.)

In addition, because the permeate flow rates achieved ($Q_6$ though $Q_9$) also decrease progressively, as the solids concentration and pressure increases from 602A to 602D, the prior art configuration illustrated in FIG. 5 is limited in the amount of flow that the system can process. Further, the pump 601 must account for the pressure loss across each module 602A-D (rather than the loss of a single module, as in the parallel configuration), and therefore, utilizes more energy than the parallel configuration illustrated in FIG. 4.

The membrane configuration 500 of the present invention of FIG. 4 includes the pump 318, sized to achieve the pressure and flow rate required by the jet aeration system or other mixing/aeration system, which can supply high cross flow velocities uniformly across each of the membrane modules such that each module operates at substantially the same flux rate thereby providing less fouling and greater permeate flow rate over the configuration 600 illustrated in FIG. 5. By maintaining a high cross flow velocity, the membrane configuration 500 of the present invention requires less downtime for cleaning and maintenance.

Moreover, in conjunction with the wastewater processing system illustrated in FIG. 3, the membrane configuration 500 illustrated in FIG. 4 further reduces the cost of operation and maintenance of the system. Specifically, the system 300 of the present invention can operate at higher overall solids concentrations over conventional systems with a lower overall sludge yield.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled. It should also be noted that the term mixing/aeration system as used herein, including in the appended claims, refers to any system that provides a mixing function, or an aeration function or both mixing and aeration functions for wastewater treatment as described herein. Furthermore, reference to the bottom of a wastewater treatment container as used herein, including in the appended claims, refers to any position approximately at or near the bottom of such a container.

What is claimed is:

1. A method of treating wastewater, comprising
   (a) admitting wastewater into a wastewater treatment container having a top, a bottom, and a height dimension therebetween and filling the wastewater treatment container to a level with wastewater;
   (b) mixing and/or aerating the wastewater in the wastewater treatment container with a mixing/aeration system positioned below the level of wastewater in the wastewater treatment container and including an inlet for receiving retentate wastewater and an outlet for discharging retentate wastewater into the wastewater treatment container;
   (c) treating the wastewater in the wastewater treatment container;
   (d) providing the wastewater from the wastewater treatment container to a solids/liquids separation system at a pressure and flow rate sufficient to affect separation of solids and the liquid in the wastewater stream within the solids/liquids separation system, the solids/liquid separation system having a retentate outlet;
   (e) recycling the retentate from the solids/liquid separation system to the inlet of the mixing/aeration system; and
   (f) drawing off treated effluent from the solids/liquid separation system;
   wherein providing the wastewater from the wastewater treatment container to the solids/liquid separation system includes pumping the wastewater using a pump having an inlet in fluid communication with the wastewater treatment container and an outlet in fluid communication with the solids/liquids separation system; and
   wherein the pump inlet is in fluid communication with the bottom of the wastewater treatment container.

2. The method of claim 1 wherein treating the wastewater in the wastewater treatment container includes treating the wastewater in the wastewater treatment container using at least one of the wastewater treatment methods selected from the group of wastewater treatment methods consisting of aerobic digestion, anaerobic digestion, anoxic digestion, phosphorus removal, chemical treatment, nitrification and denitrification.

3. The method of claim 1 wherein the solids/liquid separation system includes a membrane technology system selected from the group of membrane technology systems consisting of microfiltration, ultrafiltration, nanofiltration, reverse osmosis, and biomedical filtration systems.

4. A method of treating wastewater, comprising
   (a) admitting wastewater into a wastewater treatment container having a top, a bottom, and a height dimension therebetween and filling the wastewater treatment container to a level with wastewater;
   (b) mixing and/or aerating the wastewater in the wastewater treatment container with a mixing/aeration system positioned below the level of wastewater in the wastewater treatment container and including an inlet for receiving retentate wastewater and an outlet for discharging retentate wastewater into the wastewater treatment container;
   (c) treating the wastewater in the wastewater treatment container;
   (d) providing the wastewater from the wastewater treatment container to a solids/liquids separation system at a pressure and flow rate sufficient to affect separation of solids and the liquid in the wastewater stream within the solids/liquids separation system, the solids/liquid separation system having a retentate outlet;
   (e) recycling the retentate from the solids/liquid separation system to the inlet of the mixing/aeration system; and
   (f) drawing off treated effluent from the solids/liquid separation system;
   wherein the solids/liquid separation system includes a permeate outlet separate from the retentate wastewater outlet thereof.

5. The method of claim 4 wherein providing the wastewater from the wastewater treatment container to the solids/liquid separation system includes pumping the wastewater using a pump having an inlet in fluid communication with the wastewater treatment container and an outlet in fluid communication with the solids/liquids separation system.

6. The method of claim 4 wherein the outlet of the solids/liquid separation system is coupled in fluid communication with the inlet of the mixing/aeration system without a pumping device provided therebetween.

7. The method of claim 4 wherein the solids/liquid separation system is a solids/liquid separation system selected from the group of solids/liquid separation systems consisting of membrane technology, barrier, centrifuge, and cyclone solids/liquid separation systems.

8. The method of claim 4 wherein the solids/liquid separation system includes a membrane technology system selected from the group of membrane technology systems consisting of microfiltration, ultrafiltration, nanofiltration, reverse osmosis, and biomedical filtration systems.

9. The method of claim 4 wherein the solids/liquid separation system includes a plurality of membrane modules arranged in a parallel configuration.

10. The method of claim 9 wherein the plurality of membrane modules are arranged horizontally in a parallel configuration.

11. The method of claim 4 wherein the solids/liquid separation system includes a plurality of membrane modules arranged in a series configuration.

12. The method of claim 4 wherein the mixing/aeration system is a jet aeration system.

13. The method of claim 4 wherein the wastewater treatment container is a wastewater treatment container selected from the group of wastewater treatment containers consisting of an aeration tank, an anoxic treatment vessel, an anaerobic treatment vessel, a phosphorus removal tank, a chemical treatment tank, a nitrification tank, and a denitrification tank.

14. A The method of claim 4 wherein the combination of a mixing and/or aeration system of a biological treatment portion of a wastewater treatment system with a solids/liquid separation process reduces energy required to treat wastewater.

15. The method of claim 4 further comprising pumping the wastewater from the bottom of the wastewater treatment container via a pump having an inlet and an outlet.

16. The method of claim 15 wherein the solids/liquids separation system is in fluid communication with the outlet of the pump.

17. A method of treating wastewater, comprising
   (a) admitting wastewater into a wastewater treatment container having a top, a bottom, and a height dimension therebetween and filling the wastewater treatment container to a level with wastewater;
   (b) mixing and/or aerating the wastewater in the wastewater treatment container with a mixing/aeration system positioned below the level of wastewater in the wastewater treatment container and including an inlet for receiving retentate wastewater and an outlet for discharging retentate wastewater into the wastewater treatment container;

(c) treating the wastewater in the wastewater treatment container;

(d) providing the wastewater from the wastewater treatment container to a solids/liquids separation system at a pressure and flow rate sufficient to affect separation of solids and the liquid in the wastewater stream within the solids/liquids separation system, the solids/liquid separation system having a retentate outlet;

(e) recycling the retentate from the solids/liquid separation system to the inlet of the mixing/aeration system; and (f) drawing off treated effluent from the solids/liquid separation system;

and further comprising creating, with a pumping system, a pressure differential across the mixing/aeration system and the solids/liquid separation system to move treated wastewater from the wastewater treatment container to the inlet of the solids/liquid separation system and retentate wastewater from the outlet of the solids/liquid separation system to the inlet of the mixing/aeration system and out of the outlet of the mixing/aeration system into the wastewater treatment container.

18. The method of claim 17 wherein creating, with a pumping system, a pressure differential includes coupling the pumping system to move treated wastewater from approximately the bottom of the wastewater treatment container and wherein the pumping system and the solids/liquid separation system are elevated with respect to the bottom of the wastewater treatment container.

19. The method of claim 17 wherein creating, with a pumping system, a pressure differential includes coupling the pumping system to move treated wastewater from approximately the bottom of the wastewater treatment container and wherein the pumping system and the solids/liquid separation system are at approximately the same level as the bottom of the wastewater treatment container.

20. The method of claim 17 wherein treating the wastewater in the wastewater treatment container includes treating the wastewater in the wastewater treatment container using at least one of the wastewater treatment methods selected from the group of wastewater treatment methods consisting of aerobic digestion, anaerobic digestion, anoxic digestion, phosphorus removal, chemical treatment, nitrification and denitrification.

* * * * *